June 9, 1925.
J. N. MARTIN
ADJUSTABLE TANK CONNECTION
Original Filed Feb. 23, 1923
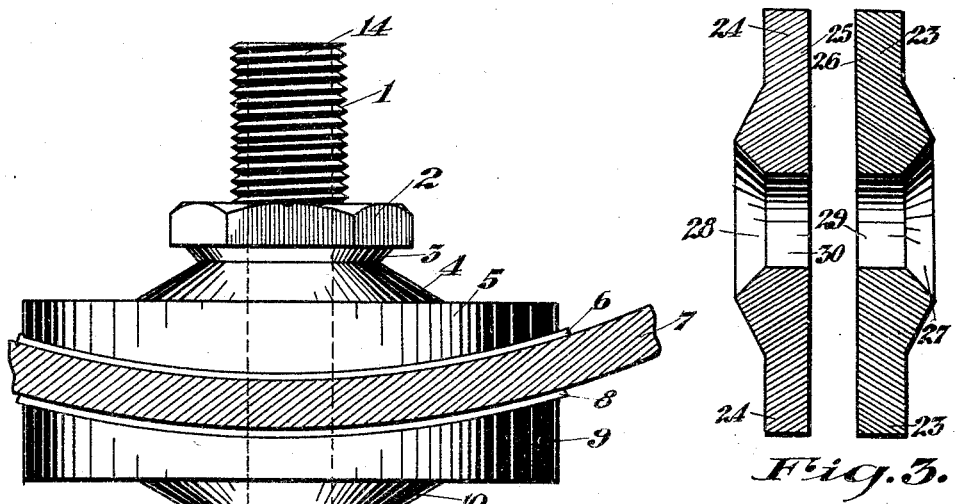
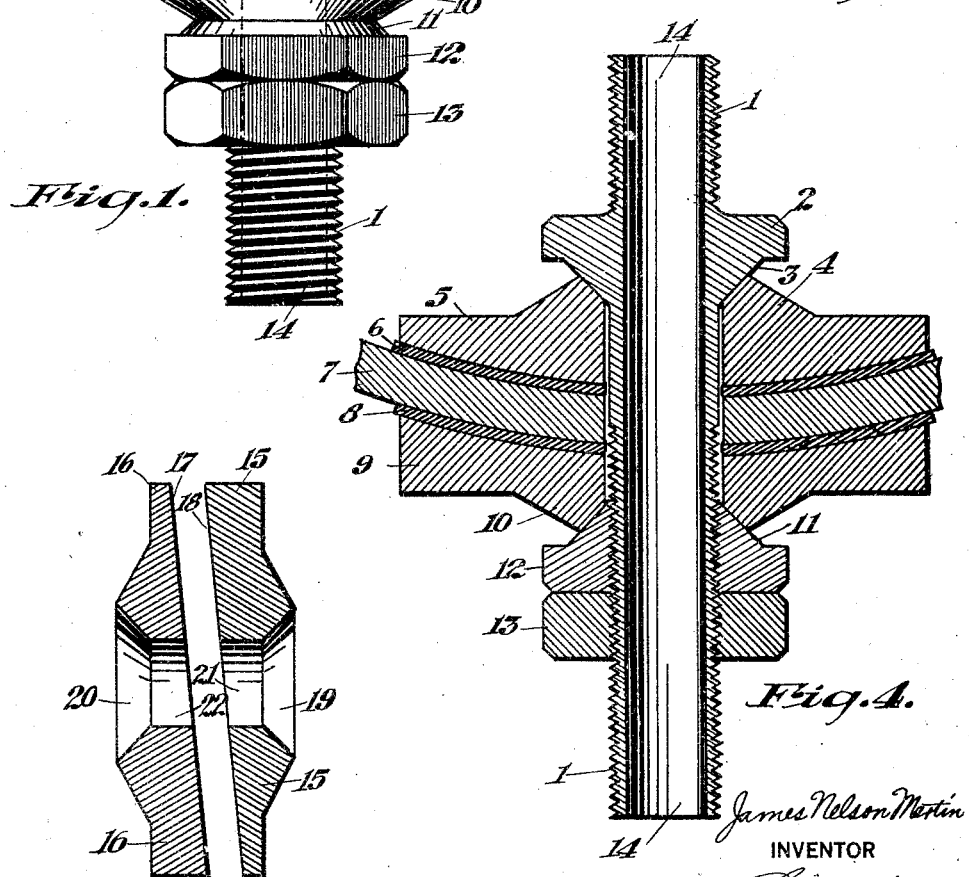
James Nelson Martin
INVENTOR
BY
ATTORNEY Patented June 9, 1925.

1,541,725

UNITED STATES PATENT OFFICE.

JAMES NELSON MARTIN, OF BARNSDALL, OKLAHOMA.

ADJUSTABLE TANK CONNECTION.

Application filed February 23, 1923, Serial No. 620,749. Renewed December 5, 1924.

*To all whom it may concern:*

Be it known that I, JAMES NELSON MARTIN, a citizen of the United States, residing at Barnsdall, in the county of Osage and State of Oklahoma, have invented a certain new and useful Improvement in Adjustable Tank Connections, of which the following is a specification, reference being had to the accompanying drawings.

My invention relates to improvements in adjustable tank connections, and consists of a standard helically threaded pipe in combination with an inner and outer flange, with an inner and outer gasket inside and outside the wall of the tank or receptacle held in place by a set-nut conically shaped fitting into a bevelled hole through the flanges and by a hexagonal nut threaded to fit the pipe and conically shaped oppositely said first conically shaped set-nut, to fit the outer flange, and with a hexagonal locknut to hold the same in place.

The object of the invention is to provide a device of this character so that a connection can be speedily and easily made without the necessity of rivets or riveting; and to entirely prevent leakage around the connection and waste of the contents of the receptacle through which the connection is made; also to provide a device of this character of novel features, simple and inexpensive in its construction, quickly and easily applied and removed, and novel and effective in accomplishing its intended purpose.

The invention, novel features, details of construction and combination of parts and other objects of the invention will be hereinafter more particularly set forth, illustrated in the accompanying one page drawing, and pointed out in the appended claims.

Referring to the drawing forming a part of this application,

Figure 1 is an elevation view of the device applicable to a circular or round tank, or receptacle.

Figure 2 is a partial sectional view of the two flanges applicable to a wooden tank the sides of which are not perpendicular but on an angle.

Figure 3 is a partial sectional view of the two flanges applicable to a straight surfaced tank or receptacle.

Figure 4 is a sectional view of Figure 1.

Like characters of reference designate like parts in all figures.

The device consists of a standard helically threaded pipe 1 a short distance from the inner end of which is a hexagonal nut 2 securely and permanently attached to said pipe 1 having its side nearest the connection conical in form 3 fitting into a hole 30 (Fig. 3) with a bevelled edge 28 (Fig. 3) the outside of which is shown at 4 and 5.

When used on a circular or round tank the portion at the gasket 6 nearest the wall of the tank 7 where the pipe penetrates is bulged, or convex. The gasket 6 is pressed by the inner flange 5 against the inside of the tank 7. The outer gasket 8 is pressed against the outside of the wall of the tank 7 by the concave outer flange 9 the lower portion of which 10 is oppositely conical to the inner flange 4 and is perforated and bevelled 29 and 27 (Fig. 3).

This bevel-edged hole is fitted by the conically shaped portion of a hexagonal nut 2, helically threaded to fit the pipe 1. When the above is so placed the outside hexagonal nut is screwed tight thereby tightening all of the parts in combination after which the hexagonal standard helically threaded locknut 13 is screwed tightly against the outside of said hexagonal conically shaped nut 12.

The use of the flanges, or connections shown at Fig. 2 and Fig. 3 are identical with their use as shown by Fig. 1, except that in Fig. 2 the flanges shown are for use on wooden tanks or receptacles in which the side walls are not perpendicular, and are on an angle from the perpendicular; and in Fig. 3 the flanges shown are for use in such tanks or receptacles in which the side walls, or portions through which an entrance is to be made, are straight surfaces instead of curved as in Figs. 1 and 4.

From the description and accompanying one page drawing, and the specifications the advantages of construction and operation will be apparent to those skilled in the art to which my invention pertains; but it will be understood that any modification within the scope of the claimed invention may be made in the construction without departing from the principle of the invention or sacrificing any of its advantages.

Having thus described the invention what is claimed and desired to be secured by Letters Patent, is:

1. An adjustable tank connection or flange as described, comprising a hollow pipe helically threaded externally, having a hexagonally headed nut permanently attached thereto a short distance from the end of said pipe inside the tank, the portion nearest the wall of the tank conically shaped, said cone fitting into a round disc or flange bevelled from the outer edge to a hole in the center surrounding said pipe, a gasket of fibre or other suitable material inside the wall penetrated, another like gasket outside said wall, another disc or flange bevelled oppositely said first one, a hexagonally headed nut helically threaded having one side conical in form fitting into said last described bevelled flange, securely tightening all of said parts on said outwardly threaded pipe, and a hexagonal helically threaded lock-nut to hold said parts in place.

2. An adjustable tank connection or flange as described comprising a hollow pipe helically threaded externally having a hexagonally headed nut permanently attached thereto a short distance from the end of said pipe inside the tank the portion nearest the wall of the tank conically shaped, the said cone fitting into a round disc or flange bulged from the outer edge to a hole in the center surrounding said pipe, the inside portion of said disc bulged or convex to fit a circularly formed tank or receptacle a gasket of fibre or other suitable material similarly shaped to said bulged or convex portion, inside the said wall penetrated another like gasket outside said wall oppositely shaped from said inner gasket, another disc or flange bulged oppositely said first one, and concave to fit the circularly formed wall of said tank or receptacle, a hexagonally headed nut helically threaded having one side conical in form fitting into said last described bulged flange, securely tightening all of said parts on said outwardly threaded pipe, and a hexagonal helically threaded lock-nut to hold said last described conically shaped nut and other parts in place.

3. An adjustable tank connection or flange as described, comprising a hollow pipe helically threaded externally, having a hexagonally headed nut permanently attached thereto a short distance from the end of said pipe inside the tank, the portion nearest the wall of the tank conically shaped, said cone fitting into a round disc or flange bevelled from the outer edge to a hole in the center surrounding said pipe, a gasket of fibre or other suitable material inside the wall penetrated, another like gasket outside said wall, another disc or flange bevelled oppositely said first one, a hexagonally headed nut helically threaded having one side conical in form fitting into said last described bevelled flange, threads on the inside of said nut meshing with threads outside said pipe, securely tightening all of said parts on said outwardly threaded pipe, a hexagonal lock-nut helically threaded inside to mesh with threads outside said pipe and to hold all of said parts securely in place.

4. An adjustable tank connection or flange as described, comprising a hollow pipe helically threaded externally, having a hexagonally headed nut permanently attached thereto a short distance from the end of said pipe inside the tank or wall, the portion nearest the wall of the tank conically shaped said cone fitting into a round disc or flange bevelled from the outer edge to a hole in the center surrounding said pipe, a gasket of fibre or other suitable material inside the wall penetrated, another like gasket outside said wall, another disc or flange bevelled oppositely said first one, the inside surfaces of said discs planed and straight and parallel to each other the lower end of the inside disc being thicker than the upper end, and the upper end of the outside disc being thicker than the lower end, a hexagonally headed nut helically threaded having one side conical in form fitting into said last described bevelled flange, threads on the inside of said nut meshing with threads outside said pipe, securely tightening all of said parts on said outwardly threaded pipe, a hexagonal lock-nut helically threaded inside to mesh with threads outside said pipe and to hold all of said parts securely in place.

JAMES NELSON MARTIN.